(12) United States Patent
Winkel et al.

(10) Patent No.: US 7,862,844 B2
(45) Date of Patent: *Jan. 4, 2011

(54) TASTE IMPROVING SUBSTANCES

(75) Inventors: Chris Winkel, Bussum (NL); Harry Renes, Lelystad (NL); Jan Visser, Huizen (NL); Nico Bouter, Blaricum (NL); Jan Bakker, Nijkerk (NL); Bart Ruisch, Hilversum (NL)

(73) Assignee: Quest International Services B.V., Naarden (NL)

( * ) Notice: Subject to any disclaimer, the term of this patent is extended or adjusted under 35 U.S.C. 154(b) by 457 days.

This patent is subject to a terminal disclaimer.

(21) Appl. No.: 11/815,233

(22) PCT Filed: Oct. 6, 2005

(86) PCT No.: PCT/NL2005/000720

§ 371 (c)(1),
(2), (4) Date: Sep. 27, 2007

(87) PCT Pub. No.: WO2006/083156

PCT Pub. Date: Aug. 10, 2006

(65) Prior Publication Data

US 2008/0131573 A1    Jun. 5, 2008

(30) Foreign Application Priority Data

Feb. 1, 2005   (EP) .................. 05100657

(51) Int. Cl.
*A23L 1/226*   (2006.01)
*A23L 1/229*   (2006.01)

(52) U.S. Cl. .................. 426/537; 426/534; 426/650

(58) Field of Classification Search .................. 426/537; 544/244, 264; 536/27.1, 28.1
See application file for complete search history.

(56) References Cited

U.S. PATENT DOCUMENTS 5,780,090 A   7/1998   Frerot et al.

FOREIGN PATENT DOCUMENTS

| EP | 1252825 | 10/2002 |
|---|---|---|
| EP | 1312268 | 5/2003 |
| EP | 1344459 | 9/2003 |
| EP | 1356744 | 10/2003 |
| WO | 9704667 | 2/1997 |

OTHER PUBLICATIONS

Rijke et al. 2007. LC-MS Study to Reduce Ion Suppression and To Identify N-lactoylguanosine 5'-monophosphate in bonito: A New Umami Molecule? J. Agric. Food Chem. 55, 6417-6423.*

* cited by examiner

*Primary Examiner*—Rena L Dye
*Assistant Examiner*—Saeeda Latham
(74) *Attorney, Agent, or Firm*—Young & Thompson

(57) ABSTRACT

The present invention in a first aspect relates to taste improvement of foodstuffs, beverages, pharmaceutics, tobacco products and oral care products, using extremely small amounts of a substance according to formula (I), or edible salts thereof: $R^1—CR^2(OR^3)—CO—X$ (I). It was found that at very low concentrations, substances represented by formula (I) are capable of modifying and complementing, the sensory impact of taste imparting substances. Thus, the present taste improving substances are advantageously applied in flavour compositions, foodstuffs, pharmaceutics, tobacco products and oral care products. Typical examples of taste improving substances according to the present invention include N-lactoyl GMP, N-lactoyl AMP, N-lactoyl CMP, N-lactoyl IMP, N-gluconyl GMP, N-gluconyl AMP, N-gluconyl CMP, N-gluconyl IMP, O-lactoyl-GMP, O-lactoyl AMP, O-lactoyl CMP, O-lactoyl IMP, O-gluconyl GMP, O-gluconyl AMP, O-gluconyl CMP and O-gluconyl IMP and mixtures thereof.

20 Claims, No Drawings

TASTE IMPROVING SUBSTANCES

FIELD OF THE INVENTION

The present invention concerns taste improvement in foodstuffs, beverages, pharmaceutics, tobacco products and oral care products. More particularly, the present invention provides flavour compositions that can be used to confer a fuller and richer taste to foodstuffs, beverages, pharmaceutics, tobacco products and oral care products. The flavour compositions according to the invention are characterised by the presence of very small quantities of one or more substances that are capable of modifying and complementing the impact of other flavour imparting substances.

The present invention also encompasses the use of very small quantities of the aforementioned taste improving substances for improving the taste of foodstuffs, beverages, pharmaceutics, tobacco products and oral care products, as well as to foodstuffs, beverages, pharmaceutics, tobacco products and oral care products containing these substances.

BACKGROUND OF THE INVENTION

"Umami" is a term commonly used to describe the taste impact of L-glutamate salts and certain nucleotides. Umami is the main taste in the Japanese stock called "dashi", and in bouillon and other stocks. Glutamic acid is a major constituent of food proteins (plant and animal) such as those abundantly found in foods such as meat, poultry, seafood and vegetables. Two nucleotides that contribute most to the umami taste, GMP (guanosine monophosphate) and IMP (inosine monophosphate) are also present in many foods. By themselves these nucleotides do not typically give as powerful a flavour result as MSG (monosodium glutamate). However, due to a synergistic interaction with MSG, a pronounced enhancing effect can be observed if these nucleotides are used in combination with MSG.

The umami taste has characteristic qualities that differentiate it from other tastes. It has been convincingly shown that umami represents the fifth taste, in addition to the other four basic tastes sweet, acid, salt and bitter. The most common descriptors that are used to describe the umami taste include "savoury", "meaty" and "broth-like". "Umami" is literally translated as "delicious".

As alternatives to MSG and 5'-nucleotides, other molecules have been proposed as (umami-like) taste modulating substances:

Organic acids like tartaric and succinic acid have been reported to exhibit taste enhancing properties (Ney [1971] Z. Lebensm. Unters. Forsch. 146: 141; Velisek et al. [1978] Nahrung 22: 735). Taste modifying properties have also been attributed to certain di- to octa-peptides (Yamasaki and Maekawa [1978] Agric. Biol. Chem. 42: 1761; Noguchi et al. [1975] J. Agric. Food Chem. 23: 49).

WO 97/04667 discloses tripeptides containing a hydrophobic amino acid residue and at least one acidic amino acid residue as well as N-lactoyl-X substances, wherein X represents an amino acid residue, as flavouring ingredients to impart savoury taste and increase the mouthfeel of foodstuffs. It is also disclosed that these peptides and derivatives can partly mimic organoleptic features of MSG.

EP-A 1 252 825 discloses flavouring compositions for imparting umami taste to food products comprising substances that are formed by the reaction of the primary or secondary amino group of an amino acid, peptide or protein with the carbonyl group of a reducing sugar. According to this document the most preferred substances are those wherein the amino acid residue is selected from glutamic acid or aspartic acid and the sugar residue is selected from fructose, glucose, maltose, lactose, galactose, rhamnose, xylose and mannose.

EP-A 1 356 744 discloses flavouring compositions containing N-acetylglycine and the use thereof for imparting umami taste to foodstuffs.

As described above umami taste and umami imparting substances contribute to the flavour of foodstuffs, especially in the savoury range.

In sweet and beverage products, further examples of the importance of the gustative dimension of flavourings have been reported. These examples include taste attributes such as bitterness, tingling and cooling-freshness.

Bitterness is an essential aspect of some food flavours, among which chocolate taste. Purine alkaloids, like theobromine and caffeine, as well as amino acids and peptides have been known for a long time as bitter substances. In British patent no. GB 1420909 it is disclosed that the bitter flavour of cocoa can be reproduced using a combination of a purine alkaloid and an amino acid or an oligopeptide which 'produces a surprisingly more natural simultaneously bitter and astringent flavour note than either of these types of substances alone'.

Menthol, an important constituent of peppermint oil, has a strong impact on flavoured products not only because of its mint smell but also because it imparts a cooling and fresh taste. Next to mint flavoured products, it has been suggested to employ menthol in other types of flavour to impart a cool taste. US patent application no. US 2005013846 for example discloses how menthol and derivatives thereof can be used as flavouring in water continuous spreadable acidified food products to obtain table spreads exhibiting a fresh, cool taste impression.

Similarly, cinnamic aldehyde and eugenol, constituents of cinnamon oil, are used in flavouring composition for confectionary products, not only for their smell but also because they impart a warm and tingling taste. The oral pungency of cinnamic aldehyde was described as burning and tingling by Cliff M and Heymann H [Journal of Sensory Studies 7 (1992) 279-290]. According to the same authors eugenol exhibits a long-lasting numbing effect. Cinnamon oil has been proposed as a taste improving flavouring. International patent application no. WO9006689 discloses that cinnamon oil, among other spice extracts, added to a minty flavour formulation, can be used to improve the long-lasting flavour of chewing-gum.

Although a lot of work has been focused on finding taste improving substances that are capable of imparting new exciting taste attributes, there still is a need for new taste improving substances, and in particular for taste improving substances that are suitable for use in both savoury and non-savoury applications.

SUMMARY OF THE INVENTION

The present inventors have surprisingly found that very small quantities of the substances represented by the following formula (I) can be used advantageously to improve the taste of foodstuffs, beverages, pharmaceutics, tobacco products and oral care products:

$$R^1-CR^2(OR^3)-CO-X \qquad (I)$$

Therefore, the present invention relates to flavour compositions, foodstuffs, beverages, pharmaceutics, tobacco products and oral care products, comprising at least one substance according to formula (I).

In co-pending, not prior published international patent application PCT/NL2005/000259 flavour compositions containing at least 0.001 wt. % (10 ppm) of the aforementioned taste improving substances are described. This international patent application also discloses the use of these substances in foodstuffs, beverages, pharmaceutics, tobacco products and oral care products in a concentration of at least 0.5 μg/kg (0.5 ppb).

The inventors have unexpectedly found that the taste improving substances described in PCT/NL2005/000259 can advantageously be applied to improve the flavour of foodstuffs, beverages, pharmaceutics, tobacco products and oral care products when it is incorporated therein in extremely low concentrations, i.e. concentration of at least 0.05 ppt and less than 0.5 ppb. Thus, the present invention relates to the flavour compositions and products containing very low concentrations of the present taste improving substances.

Other aspects of the present invention relate to the use of very small quantities of said substances for improving the taste of foodstuffs, beverages, pharmaceutics, tobacco products and oral care products, and to a process for improving the taste of these products.

The present invention also provides a method for the manufacture of a flavour composition containing very small quantities of the present taste improving substances.

The taste improving substances according to the present invention can be applied advantageously to impart desirable taste attributes to the aforementioned products.

In addition, the present taste improving substances are capable of modifying the taste impact of other flavour ingredients contained within these same products, thereby improving the overall flavour quality of these products.

DETAILED DESCRIPTION OF THE INVENTION

Accordingly, the present invention in a first aspect relates to the use for improving the taste of foodstuffs, beverages, pharmaceutics, smoking tobacco or oral care products of a substance according to formula (I), or edible salts thereof:

$$R^1—CR^2(OR^3)—CO—X \qquad (I)$$

wherein:

$R^1$ represents hydrogen; $C_1$-$C_8$ alkyl, $C_2$-$C_8$ alkenyl, $C_3$-$C_8$ cycloalkyl or $C_3$-$C_8$ cycloalkenyl, each optionally substituted with 1-8 substituents selected from hydroxyl, $C_1$-$C_3$ alkyl; $C_2$-$C_3$ alkenyl and $C_1$-$C_3$ carboxyl;

$R^2$ represents hydrogen; $C_1$-$C_8$ alkyl, $C_2$-$C_8$ alkenyl, $C_3$-$C_8$ cycloalkyl or $C_3$-$C_8$ cycloalkenyl, each optionally substituted with 1-8 substituents selected from hydroxyl, $C_1$-$C_3$ alkyl, $C_2$-$C_3$ alkenyl and $C_1$-$C_3$ carboxyl;

$R^3$ represents hydrogen; $C_1$-$C_3$ acyl or $C_1$-$C_3$ alkyl, each optionally substituted with 1-3 hydroxyl groups;

and wherein X represents either (i) a six membered heterocyclic ring, comprising at least two nitrogen atoms, which heterocyclic ring is optionally further substituted with one or more substituents selected from the group of amino; hydroxyl; oxo; alkyl; and monosaccharide unit, said monosaccharide unit optionally being esterified with one or more mono-, di- and/or triphosphate groups; or (ii) a bicyclic system comprising a five membered heterocyclic ring and a six membered heterocyclic ring, each ring comprising at least two nitrogen atoms, and each ring being optionally further substituted with one or more substituents selected from the group of amino; hydroxyl; oxo; alkyl; and monosaccharide unit, said monosaccharide unit optionally being esterified with one or more mono-, di- and/or triphosphate groups, said use comprising incorporating into said foodstuffs, beverages, pharmaceutics, smoking tobacco or oral care products at least 0.05 ppt and less than 0.5 ppb of the taste improving substances and/or edible salts thereof.

The present inventors have found that the above-mentioned substances are very useful flavour ingredients which, particularly in the presence of other flavouring substances, are capable of imparting highly appreciated taste sensations to the products in which they are incorporated, specifically "roundness", "fullness", "substance", "continuity", "complexity", "expanding", "long lasting", "late onset umami taste", "kokumi" and/or "yeasty". Because of this, the present taste improving substances can be employed to improve the taste (including "mouthfeel") of foodstuffs, beverages, pharmaceutics, tobacco products and oral care products.

The taste improving substances of the present invention as such are capable of imparting highly desirable taste attributes. In addition, it has been found that the taste improving substances according to the invention are capable of complementing and modifying the sensory impact of other flavouring substances contained in the aforementioned products, including complementing and modulating "sweet taste impact", "salt taste impact" and/or "bitterness".

Throughout this document the terms "taste" and "flavour" are used interchangeably to describe the sensory impact that is perceived via the mouth, especially the tongue, and the olfactory epithelium in the nasal cavity. The term "taste modifying" as used herein refers to the capability of a composition or substance to alter the taste impact of other, flavour imparting, substances present within the same product, with the proviso that this change in taste impact is not caused by the flavour contribution of said composition or substance per se, but instead that it mainly results from the combined effect of on the one hand the taste improving composition or substance and on the other hand the other flavour imparting substances. The present substances combine the capability of modifying the taste of other flavour substances with a taste contribution of their own. The favourable impact of the present taste improving substances is believed to be the result of the combination of these two effects.

Because the taste improving substances according to the invention are not particularly volatile, they do not produce a strong aroma impact, even though they can affect the aroma impact of other flavour substances. Here the term "aroma" refers to the aspect of taste that is perceived through the olfactory epithelium. Because of the low volatility of the present taste improving substances it is believed that the advantageous properties of these substances are somehow associated with the impact that these substances have on the sensory receptors located within the mouth.

It was found that particularly satisfying results can be obtained with taste improving substances according to formula (I) wherein X represents an optionally substituted purine or pyrimidine radical. The aforementioned purine or pyrimidine radical is advantageously substituted with at least one amino and/or at least one oxo group.

It is noted that in case X represents an unsaturated heterocyclic ring or ring system that is substituted with at least one oxo-group, enol-keto isomerisation may occur. Besides the keto tautomers explicitly defined in this document, also the enol tautomers are encompassed by the present invention.

According to a preferred embodiment, the purine or pyrimidine represented by X in formula (I) comprises at least one, more preferably at least two sites of unsaturation in the heterocyclic ring or ring system.

It is furthermore noted that in case X represents a ring or ring system having one or multiple (conjugated) sites of unsaturation, other intramolecular proton transfer reactions, i.e. other than the keto enol tautomerization described here above, can occur under many conditions, as will be appreciated by the skilled person. Hence, in this document, if X is to represent such an unsaturated ring or ring system having (multiple conjugated) sites of unsaturation, tautomers of these rings or ring systems resulting from such intramolecular proton transfer reactions are also encompassed.

The aforementioned purine and pyrimidine radicals are preferably substituted with a monosaccharide unit, especially a pentose of hexose monosaccharide unit, and most preferably a pentose monosaccharide unit. Ribose and deoxyribose are examples of pentose units which are advantageously incorporated in the present substances. The aforementioned monosaccharide unit preferably is esterified with one or more phosphate groups selected from monophosphate, diphosphate and triphosphate. Even more preferably the monosaccharide unit is esterified with one such phosphate group, monophosphate being most preferred.

According to another preferred embodiment, X represents an optionally substituted purine or a pyrimidine radical selected from the group of uracil, thymine, cytosine, guanine, adenine, hypoxanthine, xanthine, theophylline and theobromine, even more preferably, from the group of guanine, cytosine and adenine.

In a very preferred embodiment X represents guanosine monophosphate (GMP), adenosine monophosphate (AMP), cytidine monophosphate (CMP) or inosine monophosphate (IMP), more preferably X represents GMP, IMP or CMP, GMP and IMP being even more particularly preferred. Most preferably, X represents GMP. Here the term "monophosphate" also encompasses cyclic monophosphate.

According to another preferred embodiment, $R^1$ represents $C_2$-$C_8$ alkyl or $C_4$-$C_6$ cycloalkyl, said alkyl or cycloalkyl being substituted with 1-6 hydroxyl groups and/or 1-3 carboxyl groups. Even more preferably, $R^1$ represents $C_2$-$C_6$ alkyl, substituted with 2-6 hydroxyl groups. Most preferably, $R^1$ represents $C_3$-$C_5$ alkyl, substituted with 3-5 hydroxyl groups.

Alternatively, in another preferred embodiment $R^1$ represents hydrogen or $C_1$-$C_4$ alkyl, more preferably it represents $C_1$-$C_2$ alkyl, most preferably methyl.

In the aforementioned formula (I) $R^2$ preferably represents hydrogen or $C_1$-$C_4$ alkyl, most preferably hydrogen. Likewise, $R^3$ preferably represents hydrogen; or $C_1$-$C_3$ acyl, optionally substituted with 1-3 hydroxyl groups, more preferably it represents hydrogen or $C_1$-$C_3$ acyl or $C_2$-$C_3$ acyl substituted with 2-3 hydroxyl groups, most preferably $R^3$ represents hydrogen.

According to a preferred embodiment X represents a heterocyclic ring or ring system which is substituted with at least a pentose monosaccharide unit and the CO—X bond in formula (I) represents an ester bond. More particularly, it represents an ester bond connecting the $R^1$—$CR^2(OR^3)$—CO— moiety to an oxygen atom of a pentose monosaccharide unit substituted on the heterocyclic ring or ring system.

In another preferred embodiment of the invention the CO—X bond represents an amide bond, particularly an amide bond connecting the acyl group with an amino group substituted on the heterocyclic ring or ring system or with a nitrogen atom in the heterocyclic ring or ring system as described above. Most preferably, the amide bond connects the acyl group with a nitrogen atom substituted on the heterocyclic ring or ring system.

Hence, taste improving substances that are particularly preferred for improving the taste of foodstuffs, beverages, pharmaceutics, tobacco products and oral care products include N-lactoyl GMP, N-lactoyl AMP, N-lactoyl CMP, N-lactoyl IMP, N-gluconyl GMP, N-gluconyl AMP, N-gluconyl CMP and N-gluconyl IMP; N-lactoyl GMP and N-gluconyl GMP being particularly preferred. Most preferably the present taste improving substance is N-lactoyl GMP.

According to another embodiment, taste improving substances that are particularly preferred for improving the taste of foodstuffs, beverages, pharmaceutics, tobacco products and oral care products include O-lactoyl-GMP, O-lactoyl AMP, O-lactoyl CMP, O-lactoyl IMP, O-gluconyl GMP, O-gluconyl AMP, O-gluconyl CMP and O-gluconyl IMP; O-lactoyl GMP, and O-gluconyl GMP being particularly preferred.

Another aspect of the invention relates to flavour compositions comprising at least 0.1 wt. % of flavouring substances and at least 1 ppb and less than 10 ppm of one or more of the taste improving substances as defined herein before. More preferably, the flavour composition contains at least 10 ppb, even more preferably at least 50 ppb, most preferably at least 100 ppb of the present taste improving substances. Here the term "flavouring substance" refers to any substance that is capable of imparting a detectable flavour impact, especially at a concentration below 0.1 wt %, more preferably below 0.01 wt. %.

In a preferred embodiment the flavour composition according to the invention comprises a flavouring substance in an amount of at least 0.5 wt %, preferably at least 1 wt %, based on the total weight of the composition.

Typically, in the present flavour composition the taste modifying compounds and flavouring substances as defined herein before are employed in a weight ratio of less than 1:100, preferably in a weight ratio of 1:10,000 to 1:150.

The flavour composition according to the present invention may suitably be prepared in the form of a liquid, a paste or a powder. In a particularly preferred embodiment the flavour composition is a free flowing powder. The present flavour composition advantageously contains at least 0.5 wt % of a processed flavour, in particular a processed flavour that contains cystein derived Maillard reaction products.

Typical examples of flavour compositions according to the present invention include savoury flavourings, dairy flavourings, sour/acid flavourings, sweet flavourings and mint flavourings; savoury and dairy flavourings being particularly preferred.

In a particularly preferred embodiment flavouring compositions are provided comprising a taste improving substance selected from the group of N-Lactoyl GMP, O-lactoyl GMP, N-gluconyl GMP, O-gluconyl GMP and mixtures thereof, as well as a savoury flavour. Most preferably, this flavour composition is a meat flavouring or a cheese flavouring.

A further aspect of the invention concerns a process of preparing a flavour composition as defined herein before by compounding one or more of the flavouring substances with a solution containing at least 10 ppb, preferably at least 50 ppb of the present taste improving substances or edible salt thereof. The preparation of flavour compositions containing said taste improving substances in extremely low concentrations is facilitated by compounding a solution of these taste improving substances with one or more of the flavouring substances. In particular, this approach offers the advantage that it enables accurate dosing of the taste improving substances. Typically, the solution containing the taste improving substances and/or edible salts thereof is compounded with the remainder of the flavour composition in a weight ratio of less than 1:1, preferably of less than 1:5 and most preferably of less than 1:10. It is noted that the solution may suitably contain one or more flavouring substances, especially highly potent flavouring substances. The solvent employed in the solution can be any foodgrade solvent that is allowed for use in flavour compositions. Examples of suitable solvents include ethanol, water, triglyceride oil and propylene glycol.

Yet another aspect of the present invention relates to a product selected from the group consisting of foodstuffs, beverages, pharmaceutics, tobacco products and oral care products, said product comprising at least 0.05 ppt and less than 0.5 ppb of one or more taste improving substances according to formula (I) or edible salts thereof. Preferably the aformentioned products contain the present taste improving substances and/or edible salts thereof in a concentration of at least 3 ppt, more preferably of at least 10 ppt, even more preferably of at least 30 ppt and most preferably of least 50 ppt.

Typical examples of foodstuffs according to the present invention include soups, sauces, stocks, bouillons, cheese products, dressings, seasonings, margarines, shortenings, bread, pastry and noodles.

The term 'tobacco products', as used herein, refers to any type of tobacco product for smoking as well as non-smoking applications. It is furthermore noted that tobacco-like products are available for both smoking and non-smoking applications. The use of the present taste improving substances in tobacco substitutes is also encompassed by the present invention.

Yet another aspect the present invention relates to a process of improving the taste of a foodstuff, a beverage, a pharmaceutical product, a tobacco product or an oral care product, comprising adding to said foodstuff, beverage, pharmaceutical, tobacco product or oral care product at least 0.05 ppt and less than 0.5 ppb one or more taste improving substances according to formula (I) and/or edible salts thereof. Preferably, the present taste improving substances and/or edible salts thereof are added to the aformentioned products in a concentration of at least 3 ppt, more preferably of at least 10 ppt, even more preferably of at least 30 ppt and most preferably of least 50 ppt.

The taste improving substances according to formula (I) are suitably produced by reacting a substance XH with an α-hydroxyl carboxylate. Thus, yet another embodiment of the present invention relates to a process of producing a taste improving substance according to formula (I), comprising the step of reacting a substance XH with an α-hydroxyl carboxylate or an α-hydroxyl carboxylate derivative according to formula (II):

$$R^1\text{—}CR^2(OR^3)\text{—}COOR^4 \quad (II)$$

or a salt of said carboxylate or derivative, wherein X, $R^1$, $R^2$ and $R^3$ have the same meaning as defined above in relation to formula (I); and wherein $R^4$ represents hydrogen or $C_1$-$C_3$ alkyl. The invention also encompasses reacting XH with a lactone that is formed by internal esterification of a substance according to formula (II) wherein $R^1$ and/or $R^2$ contain a hydroxyl group. The present invention, in another embodiment, encompasses taste improving compositions obtainable by the process described above, flavouring compositions comprising these and the use thereof for improving the taste of foodstuffs, beverages, pharmaceutics or oral care products.

According to a particularly preferred embodiment the present taste improving substances according to formula (I) and/or edible salts thereof are prepared by dissolving a salt of the aforementioned substance XH, preferably a hydrophobic salt thereof, for example a tetrabutyl ammonium salt thereof, in an organic solvent, such as DMF or pyridine. Phosphate groups and hydroxy groups of the substance XH, if present, are protected in such a way that they cannot react, for example by coupling trimethylsilyl protecting groups to said phosphate groups and hydroxy groups. An α-hydroxy carboxylate in accordance with the present invention is then attached to an amine group of the protected purine or pyrimidine radical, preferably to a primary amine group thereof, by adding said α-hydroxy carboxylate to the organic solvent comprising the protected hydrophobic salt of the substance XH and heating the obtained mixture. Said α-hydroxy carboxylate group is preferably a hydroxy-protected α-hydroxy carboxylate, more preferably an "activated" or "reactive" hydroxy-protected α-hydroxy carboxylate, e.g an hydroxy protected α-hydroxy carboxylic acid halide, preferably α-hydroxy carboxylic acid chloride. A suitable example of an hydroxy protecting group is the trimethylsilyl group. Subsequently the protecting groups are removed, e.g. by reaction in dioxin/ammonia, and a substance represented by the aforementioned formula (I) or a salt thereof is obtained, depending on the conditions applied during the deprotecting step. After the deprotecting step the obtained product can be isolated and/or further purified, using any technique known by the skilled person, such as chromatography and/or recrystallisation steps. Optionally, in case said product is obtained as a salt, said salt can suitably be converted to any edible salt of the flavour modulating substance using techniques known by the skilled person, for example by treatment with a suitable ion exchange resin, and/or Therefore another aspect of the present invention relates to a process of preparing a taste improving substance represented by formula (I) or an edible salt thereof, comprising reacting in an organic solvent a hydrophobic salt of a substance XH, wherein X has the same meaning as defined herein before, wherein phosphate groups and hydroxy groups, if present, are protected by a protecting group, with an α-hydroxy carboxylate, preferably an activated α-hydroxy carboxylate, in accordance with the present invention, wherein the hydroxy group is protected by a protecting group; and subsequently removing the protecting groups.

The invention is further illustrated by means of the following examples.

EXAMPLES

Example 1

1000 g of lactic acid (about 90% pure), 50 g of NaCl and 250 g of GMP were thoroughly mixed. The mixture was heated and stirred at 100° C. for 4 hour. The mixture was cooled to 60° C. and 4000 g of ethyl acetate was added. The mixture was stirred for 1 h. Next, the mixture was filtered over a glass filter and the filter residue was washed with 1000 g ethyl acetate. Thus, 362 g of an almost white powder was obtained. The main taste components of the obtained product were identified by LC-MS and tasting different fractions. Using $^1$H NMR spectroscopy, it was demonstrated that the fractions exhibiting the taste described as "long-lasting" and "kokumi", contained N-lactoyl GMP and O-lactoyl-GMP.

Crude product (white powder) was dissolved for 3% in Milli-Q water. The solution was mixed with an Ultra Turrax type T25 mixer for 2 minutes at 13,500 rpm. The mixture was filtered using a pressure filter with Celite 535 as a filter aid. The clear, yellowish filtrate was used in the purification/separation step.

The lactoyl GMP solution was purified using preparative liquid chromatography, using a BioPilot separation system (Amersham, Uppsala, Sweden) with a column type XK. The separation gel was Source 30™ RPC (Amersham Biosciences, Uppsala Sweden). Gradient elution was carried out with 1% formic acid in Milli-Q water; buffer (A) and liChrosolv methanol; buffer (B) as follows: equilibration: 1.5 column volume 100% A; sample application followed by elution: 0-15 min 100% A, 1-30 min linear gradient to 15% B, a 15 to 50% B gradient in 0.5 colomn volume and hold for 2.5 column volumes. The superficial velocity was 100 cm/h during elution and 125 cm/h during the equilibration and regeneration step.

20 ml of the filtrated product was injected onto the system at a flow rate of 10 ml/min. The fractions were collected in the 1250-1600 ml range and were taken by UV monitoring and triggering. Two different fractions were collected and freeze-dried.

The 2 fractions were analysed:

Fraction A analysed by NMR and showed to contain mainly O-Lactoyl-GMP

Fraction B analysed by NMR and showed to contain mainly N-Lactoyl-GMP

Example 2

The following samples were prepared:

A: 0.6% NaCl and 0.03% MSG

B: 0.01% Fraction 2 as obtained in example 1

C: 0.6% NaCl and 0.03% MSG and 0.5 ppt Fraction B as obtained in example 1

D: 0.6% NaCl and 0.03% MSG and 0.4 ppb Fraction A as obtained in example 1

The samples were tasted by a professional panel and described as follows:

A: salty, umami

B: mild acidic, late onset umami, kokumi, full, sweet, very lingering

C: salty, umami, full, mouthfeel, kokumi, salivating and very lingering

D: salty, umami, full, after taste and lingering

The invention claimed is:

1. Flavour composition comprising at least 0.1 wt. % of flavouring substances and at least 1 ppb and less than 10 ppm of one or more taste improving substances according to formula (I) and/or edible salts thereof:

$$R^1\text{---}CR^2(OR^3)\text{---}CO\text{---}X \qquad (I),$$

wherein $R^1$ represents hydrogen, $C_1$-$C_8$ alkyl, $C_2$-$C_8$ alkenyl, $C_3$-$C_8$ cycloalkyl or $C_3$-$C_8$ cycloalkenyl;

$R^2$ represents hydrogen, $C_1$-$C_8$ alkyl, $C_2$-$C_8$ alkenyl, $C_3$-$C_8$ cycloalkyl, or $C_3$-$C_8$ cycloalkenyl;

$R^3$ represents hydrogen, or $C_1$-$C_3$ acyl or $C_1$-$C_3$ alkyl; and

X represents either (i) a six membered heterocyclic ring, comprising at least two nitrogen atoms, said heterocyclic ring optionally being further substituted with one or more substituents selected from the group of amino, hydroxy, oxo, alkyl, and monosaccharide unit, said monosaccharide unit optionally being esterified with one or more mono-, di- and/or triphosphate groups; or (ii) a bicyclic ring system comprising a five membered heterocyclic ring and a six membered heterocyclic ring, each ring comprising at least two nitrogen atoms, and each ring being optionally further substituted with one or more substituents selected from the group of amino, hydroxy, oxo, alkyl, and monosaccharide unit, said monosaccharide unit optionally being esterified with one or more mono-, di- and/or triphosphate groups.

2. Flavour composition according to claim 1, wherein X represents an optionally substituted purine or a pyrimidine radical that is substituted with a pentose monosaccharide unit said pentose monosaccharide unit optionally being esterified with one or more mono-, di- and/or triphosphate groups.

3. Flavour composition according to claim 1, wherein X represents a purine or a pyrimidine radical substituted with a primary amino group and optional further substituents.

4. Flavour composition according to claim 1, wherein X represents a purine or a pyrimidine radical selected from the group of uracil, thymine, cytosine, guanine, adenine, inosine, xanthine, theophylline and theobromine.

5. Flavour composition according to claim 1, wherein $R^1$ represents $C_2$-$C_8$ alkyl or $C_4$-$C_6$ cycloalkyl, said alkyl or cycloalkyl being substituted with 1-6 hydroxyl groups and/or 1-3 carboxyl groups.

6. Flavour composition according to claim 1, wherein $R^2$ represents hydrogen or $C_1$-$C_4$ alkyl.

7. Flavour composition according to claim 1, wherein the taste improving substance is selected from the group of N-lactoyl guanosine monophosphate (GMP), N-lactoyl adenosine monophosphate (AMP), N-lactoyl cytidine monophosphate (CMP), N-lactoyl inosine monophosphate (IMP), N-gluconyl GMP, N-gluconyl AMP, N-gluconyl CMP, N-gluconyl IMP, O-lactoyl-GMP, O-lactoyl AMP, O-lactoyl CMP, O-lactoyl IMP, O-gluconyl GMP, O-gluconyl AMP, O-gluconyl CMP and O-gluconyl IMP and mixtures thereof.

8. Flavour composition according to claim 1, wherein the taste improving substance is N-lactoyl GMP.

9. Process of preparing a flavour composition according to claim 1, wherein one or more of the flavouring substances are compounded with a solution containing at least 10 ppb of the substance according to formula (I) or edible salts thereof.

10. Product selected from the group consisting of foodstuffs, beverages, pharmaceutics, tobacco products and oral care products, comprising at least 0.05 ppt and less than 0.5 ppb of a taste improving substance according to formula (I) as defined in claim 1, or edible salts thereof.

11. Process of improving the taste of a foodstuff, a beverages, a pharmaceutic product or an oral care product, comprising adding to said foodstuff, beverage, pharmaceutical product or oral care product a taste improving substance according to formula (I) as defined in claim 1 and/or edible salts thereof, in an amount of at least 0.05 ppt and less than 0.5 ppb.

12. Process of preparing a taste improving substance represented by formula (I) as defined in claim 1, or an edible salt thereof, comprising reacting in an organic solvent a hydrophobic salt of a substance XH, wherein X has the same meaning as defined in claim 1, and phosphate groups and hydroxy groups, if present, are protected by a protecting group, with an α-hydroxy carboxylate, wherein the hydroxy group is protected by a protecting group; and subsequently removing the protecting groups.

13. Flavour composition according to claim 2, wherein X represents a purine or a pyrimidine radical substituted with a primary amino group and optional further substituents.

14. Flavour composition according to claim 2, wherein X represents a purine or a pyrimidine radical selected from the group of uracil, thymine, cytosine, guanine, adenine, inosine, xanthine, theophylline and theobromine.

15. Flavour composition according to claim 2, wherein $R^1$ represents $C_2$-$C_8$ alkyl or $C_4$-$C_6$ cycloalkyl, said alkyl or cycloalkyl being substituted with 1-6 hydroxyl groups and/or 1-3 carboxyl groups.

16. Flavour composition according to claim 2, wherein $R^2$ represents hydrogen or $C_1$-$C_4$ alkyl.

17. Flavour composition according to claim 1, wherein $R^1$ represents $C_1$-$C_8$ alkyl, $C_2$-$C_8$ alkenyl, $C_3$-$C_8$ cycloalkyl or $C_3$-$C_8$ cycloalkenyl, each optionally substituted with 1-8 substituents selected from hydroxyl, $C_1$-$C_3$ alkyl, $C_2$-$C_3$ alkenyl and $C_1$-$C_3$ carboxyl.

18. Flavour composition according to claim 1, wherein $R^2$ represents $C_1$-$C_8$ alkyl, $C_2$-$C_8$ alkenyl, $C_3$-$C_8$ cycloalkyl or $C_3$-$C_8$ cycloalkenyl, each optionally substituted with 1-8 substituents selected from hydroxyl, $C_1$-$C_3$ alkyl, $C_2$-$C_3$ alkenyl and $C_1$-$C_3$ carboxyl.

19. Flavour composition according to claim 1, wherein $R^3$ represents $C_1$-$C_3$ acyl or $C_1$-$C_3$ alkyl, each optionally substituted with 1-3 hydroxyl groups.

20. Flavour composition according to claim 2, wherein the pentose monosaccharide unit is ribose or deoxyribose.

* * * * *